US005317684A

United States Patent [19]

Penna

[11] Patent Number: 5,317,684

[45] Date of Patent: May 31, 1994

[54] METHOD OF STORING CHARACTER DATA IN A DISPLAY DEVICE

[75] Inventor: David E. Penna, Redhill, England

[73] Assignee: U.S. Philips Corporation, New York, N.Y.

[21] Appl. No.: 962,165

[22] Filed: Oct. 15, 1992

Related U.S. Application Data

[63] Continuation of Ser. No. 860,198, Mar. 26, 1992, abandoned, which is a continuation of Ser. No. 646,515, Jan. 25, 1991, abandoned, which is a continuation of Ser. No. 012,967, Feb. 10, 1987, abandoned.

[30] Foreign Application Priority Data

Feb. 17, 1986 [GB] United Kingdom ................ 8603850

[51] Int. Cl.[5] .............................................. G06F 15/62

[52] U.S. Cl. .................................... 395/150; 395/164

[58] Field of Search ............... 395/150, 151, 109, 162, 395/164; 340/750

[56] References Cited

U.S. PATENT DOCUMENTS

| | | | |
|---|---|---|---|
| 4,079,458 | 3/1978 | Rider et al. | 364/900 |
| 4,228,510 | 10/1980 | Johnson et al. | 364/521 |
| 4,296,476 | 10/1981 | Mayer et al. | 364/900 |
| 4,408,197 | 10/1983 | Komatsu et al. | 340/720 |
| 4,408,200 | 10/1983 | Bradley | 340/747 |
| 4,589,144 | 5/1986 | Namba | 382/61 |
| 4,622,546 | 11/1986 | Sfarti et al. | 340/748 |
| 4,641,351 | 2/1987 | Preston | 382/6 |
| 4,642,789 | 2/1987 | Lavelle | 364/900 |
| 4,649,380 | 3/1987 | Penna | 340/750 |
| 4,663,619 | 5/1987 | Staggs et al. | 340/750 |
| 4,672,371 | 6/1987 | Bugg | 340/749 |
| 4,695,835 | 9/1987 | Bugg | 340/750 |

OTHER PUBLICATIONS

D. E. Schreiber, "Computing a Set of Triangular Plates Which Represent a Potential Surface of a Scalar Function Defined at the Vertices of a Three-Dimensional Cartesian Mesh", IBM Technical Disclosure Bulletin, vol. 18, No. 4, Sep. 1975.

*Primary Examiner*—Heather R. Herndon
*Attorney, Agent, or Firm*—Steven R. Biren

[57] ABSTRACT

A logic processor-controlled data display apparatus having a display memory in which pixel data representing text for display is stored in bit-map form. The pixel data is produced for each display from character data stored in a background memory. When the character data is stored in bit-map form it can be read directly from the background memory bit-by-bit and written into the display memory as the pixel data. However, this process takes a large number of programme steps, so that the transfer of the data is relatively stow. The present invention provides for the storage in the background memory of character data in the form of machine code sub-routines. The sub-routine for a character contains instructions for identifying the shape-defining pixels (dots) of the character relative to a base dot position and the sub-routine is run to write these pixels into the display memory following location of the base dot position in the display memory.

8 Claims, 6 Drawing Sheets

| | CH | B |
|---|---|---|
| b1 | 0 0 1 0 0 | 0 0 0 |
| b2 | 0 0 1 0 0 | 0 0 0 |
| b3 | 1 1 1 1 1 | 0 0 0 |
| b4 | 0 0 1 0 0 | 0 0 0 |
| b5 | 0 0 1 0 0 | 0 0 0 |

FIG. 3

| | M/C INSTR. | | PIXEL POSN |
|---|---|---|---|
| 1. | MOVE B # 2, | DO | = COLOUR |
| 2. | MOVE B # 82, | AO | = 82 |
| 3. | MOVE B DO,2 | (AO) | = 84 |
| 4. | MOVE B DO,18 | (AO) | = 100 |
| 5. | MOVE B DO,32 | (AO) | = 114 |
| 6. | MOVE B DO,33 | (AO) | = 115 |
| 7. | MOVE B DO,34 | (AO) | = 116 |
| 8. | MOVE B DO,35 | (AO) | = 117 |
| 9. | MOVE B DO,36 | (AO) | = 118 |
| 10. | MOVE B DO,50 | (AO) | = 132 |
| 11. | MOVE B DO,66 | (AO) | = 148 |
| 12. | JUMP ---- | | |

FIG. 4

| | M/C INSTR. | | PIXEL POSN |
|---|---|---|---|
| 1. | MOVE B # 2, | DO | = COLOUR |
| 2. | MOVE B # 148, | AO | = 148 |
| 3. | MOVE B DO, | (AO-16) | = 132 |
| 4. | MOVE B DO, | (AO-32) | = 116 |
| 5. | MOVE B DO, | (AO-48) | = 100 |
| 6. | MOVE B DO, | (AO-64) | = 84 |
| 7. | ADD DO, # - | 2(AO-64) | = 114 |
| 8. | ADD DO, # - | 1(AO-64) | = 115 |
| 9. | ADD DO, # + | 1(AO-64) | = 117 |
| 10. | ADD DO, # + | 2(AO-64) | = 118 |
| 11. | JUMP ---- | | |

FIG. 5

| M/C INSTR. | | PIXEL POSN |
|---|---|---|
| 1. MOVE B # 2, DO | = | COLOUR |
| 2. MOVE B # 177, AO | = | 177 |
| 3. MOVE B DO, 3 (AO) | = | 180 |
| 4. MOVE B DO, 9 (AO) | = | 186 |
| 5. MOVE B DO, -7 (AO) | = | 170 |
| 6. MOVE B DO,-13 (AO) | = | 164 |
| 7. MOVE B DO,-22 (AO) | = | 155 |
| 8. MOVE B DO,-24 (AO) | = | 153 |
| 9. MOVE B DO,-28 (AO) | = | 149 |
| 10. MOVE B DO,-30 (AO) | = | 147 |
| 11. MOVE B DO,-38 (AO) | = | 139 |
| 12. MOVE B DO,-40 (AO) | = | 137 |
| 13. MOVE B DO,-44 (AO) | = | 133 |
| 14. MOVE B DO,-46 (AO) | = | 131 |
| 15. MOVE B DO,-53 (AO) | = | 124 |
| 16. MOVE B DO,-57 (AO) | = | 120 |
| 17. MOVE B DO,-59 (AO) | = | 118 |
| 18. MOVE B DO,-63 (AO) | = | 114 |
| 19. MOVE B DO,-69 (AO) | = | 108 |
| 20. MOVE B DO,-73 (AO) | = | 104 |
| 21. MOVE B DO,-75 (AO) | = | 102 |
| 22. MOVE B DO,-79 (AO) | = | 98 |
| 23. MOVE B DO,-84 (AO) | = | 93 |
| 24. MOVE B DO,-90 (AO) | = | 87 |
| 25. MOVE B DO,-96 (AO) | = | 81 |
| 26. MOVE B DO,-100(AO) | = | 77 |
| 27. MOVE B DO,-106(AO) | = | 71 |
| 28. MOVE B DO,-112(AO) | = | 65 |
| 29. MOVE B DO,-116(AO) | = | 61 |
| 30. MOVE B DO,-122(AO) | = | 55 |
| 31. MOVE B DO,-128(AO) | = | 49 |
| 32. MOVE B DO,-132(AO) | = | 45 |
| 33. MOVE B DO,-138(AO) | = | 39 |
| 34. MOVE B DO,-144(AO) | = | 33 |
| 35. JUMP ---- | | |

FIG.7

METHOD OF STORING CHARACTER DATA IN A DISPLAY DEVICE

This is a continuation of application Ser. No. 07/860,198 filed on Mar. 26, 1992, now abandoned, which is a continuation of application Ser. No. 07/646,515 filed Jan. 25, 1991, now abandoned which is a continuation of application Ser. No. 07/012,967, filed Feb. 10, 1987, now abandoned.

BACKGROUND OF THE INVENTION

The invention relates to a method of storing character data in a background memory of a digitally operable data display apparatus for displaying as an entity on a screen of a display device a quantity of data which is represented by digital codes stored in a display memory, the displayed data being in the form of discrete pixels or dots, each of which has its colour and/or luminance defined by a respective digital code in the display memory at a location corresponding to the position of the pixel in the display, the apparatus including a processor for controlling digitally the storage, selection and display of data.

The invention further relates to a method of displaying data in a digitally operable data display apparatus for displaying as an entity on a screen of a display device a quantity of data which is represented by digital codes stored in a display memory, the displayed data being in the form of discrete pixels or dots, each of which has its colour and/or luminance defined by a respective digital code in the display memory at a location corresponding to the position of the pixel in the display, the apparatus including a processor for controlling digitally the storage, selection and display of data.

This invention still further relates to digitally operable data display apparatus for displaying as an entity on a screen of a display device a quantity of data which is represented by digital codes stored in a display memory, the displayed data being in the form of discrete pixels or dots, each of which has its colour and/or luminance defined by a respective digital code in the display memory at a location corresponding to the position of the pixel in the display, the apparatus including a processor for controlling digitally the storage, selection and display of data.

The display produced by apparatus of the above type is termed a bit-map display, and is, for example, a 320×250 resolution dot matrix colour display which may be displayed on the screen of a CRT (cathode ray tube) or other display device. In the case of a raster scan display device the digital codes stored in the display memory are accessed repeatedly by the processor to update the display in a recurrent cycle of scanning lines which may be produced with or without interlaced field scanning.

Where a data display apparatus of the above type is to provide comprehensive and visually aesthetic text displays, it is usually a requirement that data for a large number of different character fonts is provided in a background memory and the data for individual characters selected for display is read from the background memory and written into the display memory.

It is known to store the data for each character of each character font in a bit-map form which corresponds to the image and size of the character shape. This character data, when selected, can then be transferred directly to the display memory with a minimum of processor logic.

With the known techniques the speed of transfer of the data from the background memory to the display memory is limited due to the relatively large number of processor instructions needed to effect the transfer.

SUMMARY OF THE INVENTION

It is an object of the present invention to enable the provision of data display apparatus of the above type in which the character data may be written into the display memory more quickly.

The invention provides a method of storing character data as set forth in the opening paragraph characterized in that the method consists of generating a machine code sub-routine as the data for each of a plurality of characters, and storing the machine code sub-routines at predetermined locations in the background memory.

The main advantage that the present invention achieves is the significant saving in the number of processor operating steps that are required to write the data for a character into the display memory. Therefore, for a given speed of operation of the processor, the contents of the display memory can be updated for the display of a new page of text far more quickly than in apparatus where character data is stored in the background memory in bit-map form.

The invention also extends to a memory device containing character data which are stored as machine code sub-routines. Such a memory device may be a floppy disk or the like, or a read-only memory, in which a large number of different character data can be provided in a simple and relatively inexpensive way.

The invention further provides a method of displaying data as set forth in the second paragraph characterized in that the method comprises storing character data in the background memory as a machine code sub-routine for each of a plurality of characters, selecting a character for display, selecting the position of the character on the display screen, causing the appertaining sub-routine to be run to write the pixel data for the character in bit-map form in the appropriate memory location in the display memory, and causing the data in the display memory to be displayed on the display screen.

The invention still further provides a digitally operable data display apparatus as set forth in the third paragraph characterized by means for storing character data in a background memory in the form of a machine code sub-routine for each of a plurality of characters, means for selecting a character for display, and means for causing the sub-routine appertaining to the selected character to be run to write the pixel data for the character in bit-map form in the appropriate memory location in the display memory.

BRIEF DESCRIPTION OF THE DRAWINGS

In further considering the nature of the invention, reference will now be made by way of example to the accompanying drawings of which:

FIG. 3 shows an example of character data as stored in bit-map form in a background memory;

FIGS. 4 and 5 show two machine code sub-routines which form character data in a background memory in accordance with the invention;

FIG. 7 shows a machine code sub-routine which forms the character data in the background store for the character represented in FIG. 6;

Figure 1:
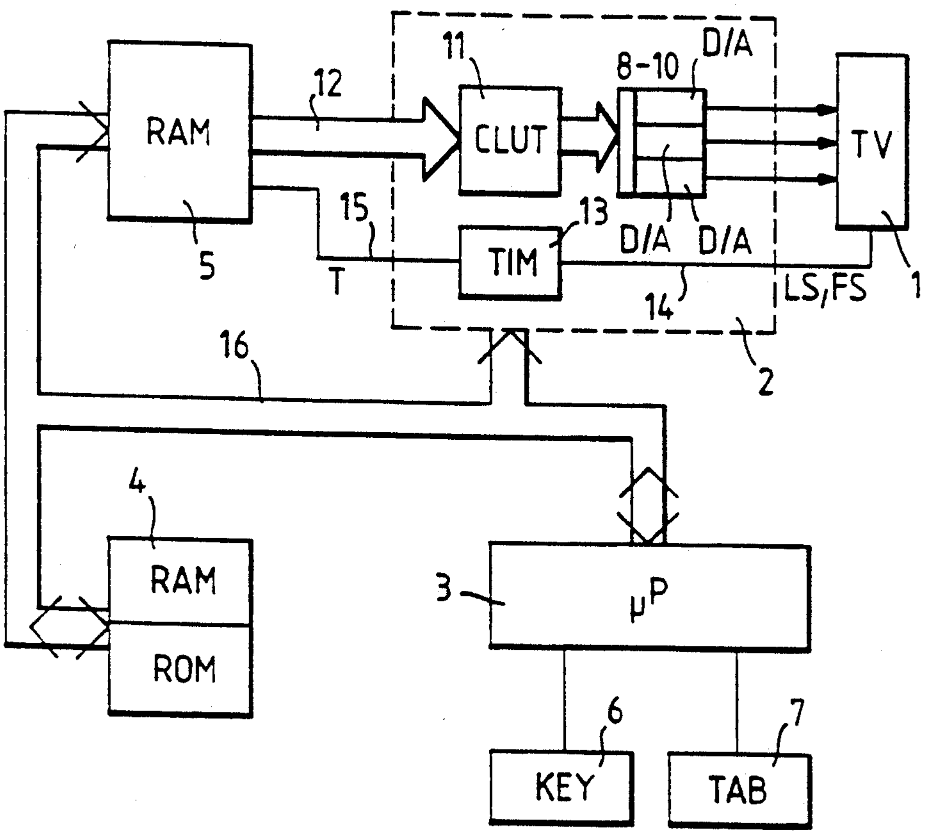
FIG. 1 shows a block diagram of a data display apparatus in which the present invention can be embodied.

Referring to the drawings, the data display apparatus shown in FIG. 1 comprises a display device 1, a display generator 2, a processor 3, a background memory 4, a display memory 5 and user interface apparatus 6 and 7. The display device is suitably a colour television monitor which is connected to receive R, G, B, video signals from the display generator 2. These R, G, B, video signals are produced in the display generator 2 by three digital-to-analog converters 8, 9 and 10, respectively. The display generator 2 also included a colour look-up table 11 which is suitably a read/write memory and is responsive to dot information received from the display memory 5 over a bus 12 to produce digital signals for driving the converters 8, 9 and 10. A display timer 13 in the display generator 2 provides line and field synchronization signals LS and FS for the television monitor 1 over a connection 14. The timer 13 also provides over a connection 15 timing signals T for controlling the transfer of dot information from the display memory 5 to the colour look-up table 11. The display memory 5 is a random-access memory which has a capacity for storing dot information for at least one display frame. The dot information comprises digital codes composed of one or more bits per dot to be display, depending on the range of colors afforded by the colour look-up table 11. A combined address/data bus 16 interconnects the display generator 2 and the display memory 5 with the processor 3. The background memory 4, which is also at least partially a random-access memory, is also connected to the address/data bus 16. The background memory 4 may also have a read-only memory part of which contains permanent program data for controlling the "house-keeping" operations of the processor 3. The user interface apparatus comprises a keyboard data entry device 6 and a writing tablet 7. Such interface apparatus is well-known in the art and specific details thereof are unnecessary for an understanding of the present invention. The processor 3 can be a commercially available microprocessor, for instance the Signetics S68000 $\mu$p.

Figure 2:
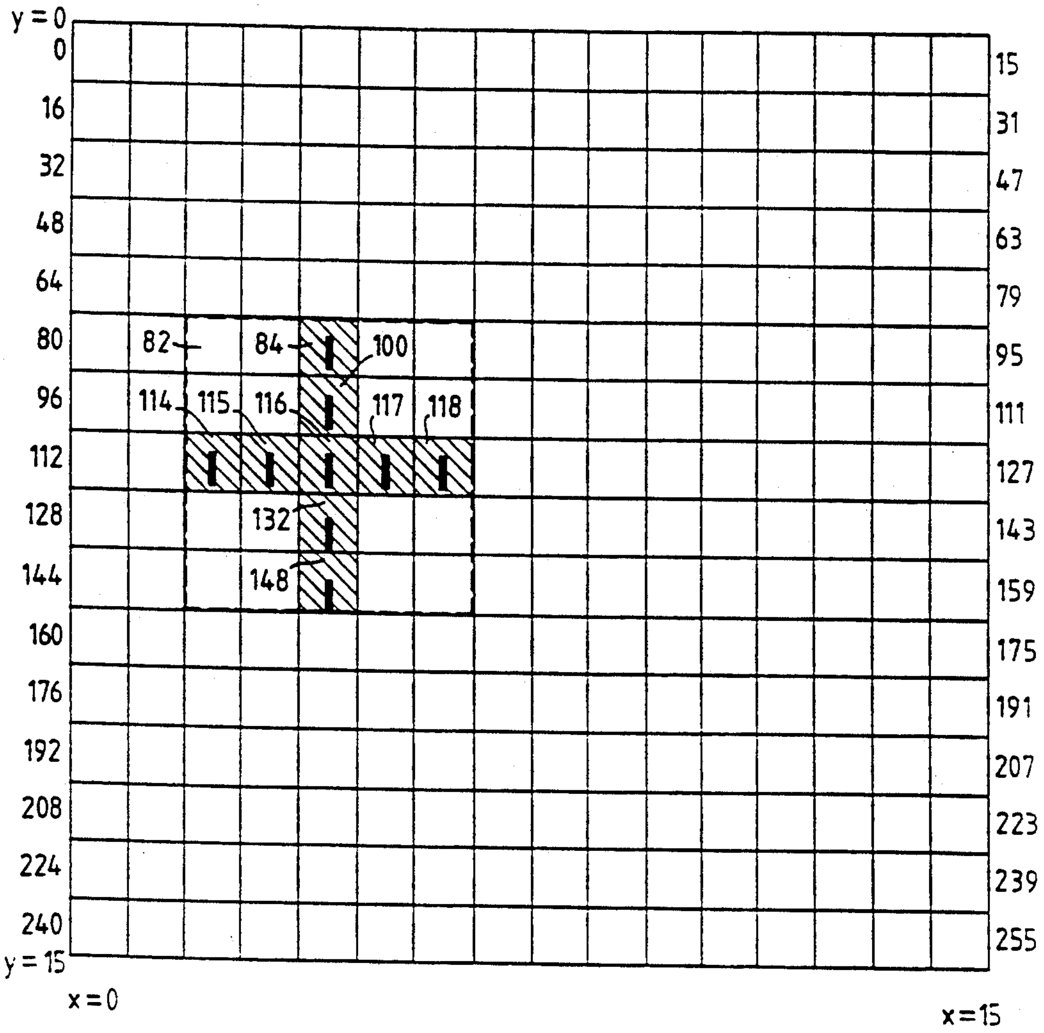
FIG. 2 shows diagrammatically a bit-map display memory.

Consider now a prior art method for storing character data in a background memory. By way of illustration it will be assumed that a character which is available for display, and the data for which is stored in the background memory, is a simple cross (+) composed of five vertical pixels and five horizontal pixels. It will also be assumed that this cross (+) is to be written into a bit-map display memory BM/DM in the position CP shown in FIG. 2. The bit-map display memory represented in FIG. 2 is only of small size (15×15 pixels) which is adequate for the present description. In practice, a bit-map display memory would normally be much larger. For example, a 384×256 pixel display will require a display memory of at least 384×256 bit locations. When the character data for this cross (+) is stored in the background memory in bit-map form in a cell pattern, it can take the form shown in FIG. 3. This character data comprises a 5×5 bit matrix CH in which logic '1's (foreground bits) are stored in memory locations corresponding to the character shape (foreground locations) and logic '0's are stored in background locations. If the background memory contains memory locations of 8-bit bytes, as is common, then five such bytes b1 to b5 are required to store the character data. Consequently the byte area signified at B is redundant in this case.

In order to write the character data into the position CP the following programme steps have to be performed by the processor.

1. Determine the x size and the y size of the character. This could, for example, be encoded as one or more bytes of memory associated with each character.
2. Determine the character position in the bit-map display memory (start y, start x). This may be determined from the character position on the display selected by the keyboard 6 or writing tablet 7.
3. For y from st art y to stop y (5 times) and for x from start x to stop x (5 times), that is for each of the 25 pixels in the character cell, read the bit data in the background memory and if the bit is a '1'write the bit information for the pixel concerned in the display memory.

The programme step will take of the order of 6–8 instructions, for each bit, so that a total of up to 200 instructions will be necessary to write the data for the cross (+) into the display memory.

The number of instructions for writing character data into the display memory can be reduced considerably by means of the invention. FIG. 4 shows the machine code instructions that are required to write the cross (+) into the position CP by means of a method according to the invention. Before writing into the display memory, data which identifies the colour that the cross (+) is to be displayed in is entered into a first register (D0). Data which identifies a base dot position for the character position is then entered into another register (A0). The background memory includes an address table for each possible character shape that can be displayed. When a character is selected by keyboard operation, the selected character is identified and the address for the character data is read from the address table. This character which is in the form of machine coded instructions is then accessed and executed by the processor to write the character data into the display memory.

The instruction (1) in FIG. 4 provides the character colour. The instruction (2) provides the base dot address which is pixel bit position 82 in the bit-map display memory BM/DM. The remaining instructions (3) to (11) cause the processor to step in turn to each of the pixel dot positions which are to contain a pixel for the character shape. Within each of these instruction s (3) to (11), one skilled in the art will recognize that there is encoded the location of one of the foreground pixel dots, relative tot he base dot; specifically, the offsets 2, 18, 32, 33 etc. before the pixel positions 84, 100, 114, 115 etc. relative to the base dot location 82. The person skilled in the art will further recognize that writing into the display memory is achieved using far fewer programme instructions than are required when character data is stored in the background memory in bit-map form as in cell pattern.

The machine code instructions can also be arranged to write into the display memory the character data starting from a base dot position which is the first actual pixel position for a character.

FIG. 5 shows an example of these alternative machine code instructions. In this instance, the register A0 is initially set to pixel position 148, and instruction (2) writes in a pixel at that position. Instructions (3) to (6) then successively write into pixel positions 132, 116, 100 and 84. Different instructions (7) to (10) then write into the remaining pixel positions 114, 115, 117 and 118.

Figure 6:
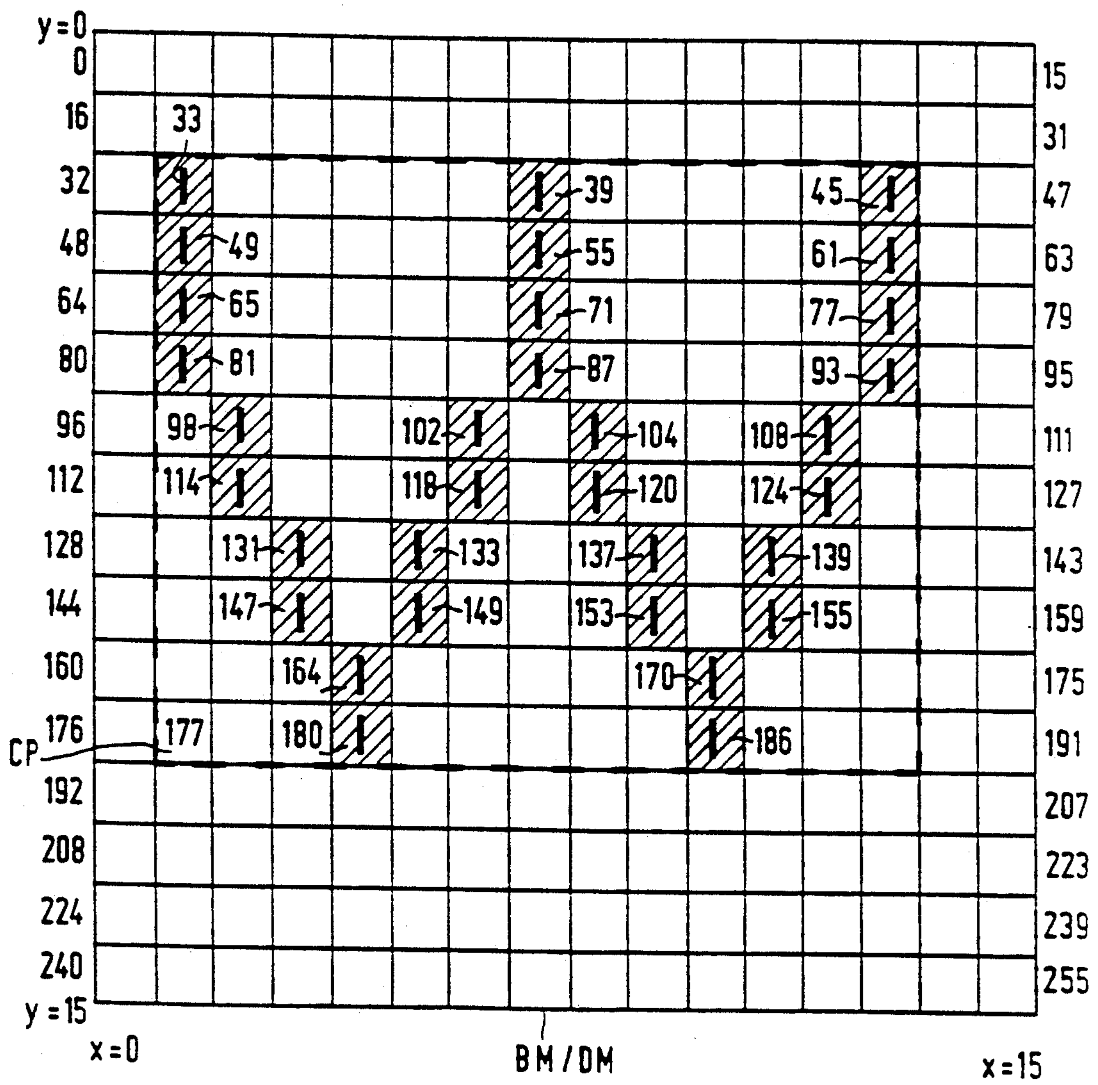
FIG. 6 shows diagrammatically the bit map memory of FIG. 2 with a different character represented.

FIG. 6 shows the character W written into the bit map display memory BM/DM, the character W having its base position CP at pixel 177 in the memory.

FIG. 7 shows the machine code instructions that are required to write the character W into the position CP (177). Before writing into the display memory, data which identifies the colour that the character W is to be displayed in is entered into a first register (D0). Data which identifies a base dot position for the character position is then entered into second register (A0). The background memory includes an address table for each possible character shape that can be displayed. When a character is selected by keyboard operation, the selected character is identified and the address for the character data is read from the address table. This character data, which is in the form of machine coded instructions is then accessed by the processor to write the character data into the display memory.

The instruction (1) in FIG. 7 provides the character colour. The instruction (2) provides the base dot address which is pixel bit position 177 in the bit-map display memory BM/DM. The remaining instructions (3) to (34) cause the processor to step in turn to each of the pixel dot positions which are to contain a pixel for the character shape.

Figure 8:
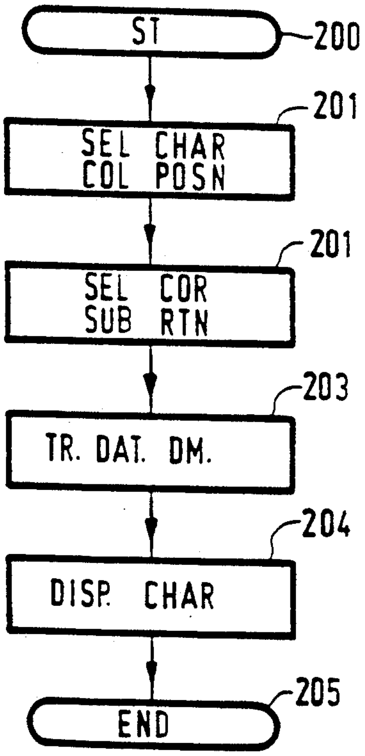
FIG. 8 is a flow diagram illustrating the selection and generation of characters for display.
Figure 9:
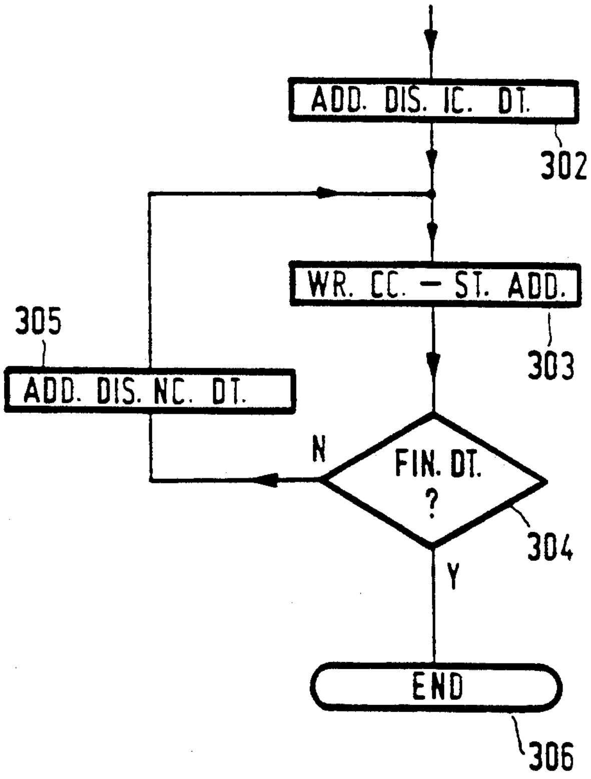
FIG. 9 is a flow diagram illustrating the transfer of the character data to the bit map display memory under the control of a selected machine code sub routine.

FIGS. 8 and 9 are flow diagrams which illustrate the generation of characters for display on the display apparatus. In FIG. 8 reference 200 represents the start of the process and reference 201 represents the selection of the character to be displayed, its colour, and its base position (equivalent to CP in FIGS. 2 and 6). Reference 202 represents the selection of the corresponding character machine code sub-routine from the background memory. Reference 203 represents the running of the machine code sub-routine to cause the selected character to be read in bit-map form into the display register. Reference 204 represents the display of the character on the display screen from the information in the bit-map display. Reference 205 denotes the end of the process.

FIG. 9 illustrates the transfer of the character data from the background memory to the bit map memory BM/DM under the control of a selected machine code sub-routine. The colour and base position having been specified (reference 201, FIG. 8.) the running of the sub-routine accesses first the distance (relative location), in number of pixels, from the base pixel to the first active pixel dot, box 302. This combined with the base pixel address comprises the display memory address and the code in register D0 representing the pixel colour is read into the location in the display memory represented by that address, box 303. If that is the final active pixel for the selected character then the process ends, box 306. Other wise the distance in number of pixels from the base pixel to the next active pixel dot is accessed, box 305. Again the code in register D0 representing the pixel colour is read into the display memory location represented by the new distance and base address. This sequence is repeated until the final pixel element has been written, box 304.

Thus in order to generate each sub-routine the bit-mapped version of the character is examined and the distance of each active dot in the character from the base dot is calculated. The sub-routine then consists of stepping through addresses of the active dots to read the colour information into the bit-mapped display memory. The sub-routine effectively comprises a list of machine code instructions each of which contain the distance, in terms of number of pixels, to the next active dot of the individual character with respect to a base dot of the matrix. It will be seen that instructions (1) and (2) of FIGS. 4, 5 and 7 are essentially the same and consequently these do not need to be stored with the separate character sub-routines but can be part of the display controlling program.

From reading the present disclosure, other modifications will be apparent to persons skilled in the art. Such modifications may involve other features which are already known in the design and use of data display apparatus and devices and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalization or modification of one or more of those features which would be obvious to persons skilled in the art, whether or not it relates to the same invention as presently claimed in any claim and whether or not lit mitigates any or all of the same technical problems as does the present invention. The applicants hereby given notice that new claims may be formulated to such features and/or combinations of such features during the prosecution of the present application or of any further application derived therefrom.

I claim:

1. A method of storing character data for use in the display of characters selected from a pre-defined character set in an output image of a display device, said output image comprising a regular array of discrete pixels, the display device including a background memory, a microprocessor operable to execute machine code program instructions stored in the background memory, and a display memory, the display memory storing the output image in the form of a display bit map and having a plurality of locations which correspond to and store color data for respective pixels of the image, said method comprising;

defining a character bit map for each character of the set, said character bit map identifying a plurality of character-shape-defining foreground pixels and a plurality of other, background pixels, each pixel having a corresponding pixel location relative to a character base location;

encoding each character bit map to generate a machine code routine which, when executed, will cause the microprocessor to write color data to all the pixel locations of the display memory which correspond to foreground locations of the character bit map; and storing said machine code routines for the character set in the background memory of the display device;

the step of encoding the machine code subroutine corresponding to each character of the set including the steps of identifying the relative locations of the foreground pixels of the character shape and encoding said relative locations within the instructions of the machine code subroutine in such a form that when the machine code subroutine is executed the microprocessor neither tests pixel locations of the character bit map to identify the foreground pixels, nor writes color values for the entire character bit map.

2. A method as claimed in claim 1, wherein each of said machine code instructions, when executed, will cause color data to be written in the display memory at a location defined by the pixel location encoded in the instruction and a character-base memory location stored in an address register of the microprocessor prior to execution of the instruction.

3. A method as claimed in claim 2, wherein the color data written by each said instruction is a value stored prior to execution in a data register of the microprocessor.

4. A method as claimed in claim 2, wherein the microprocessor is one of the 680XX family, whose instruction set includes the instruction set of the 68000 microprocessor, and wherein the plurality of machine code instructions includes at least one instruction in an Address Register Indirect with Displacement addressing mode of said microprocessor, the relative pixel location being at least partly encoded by the displacement field of said instruction.

5. A method as claimed in claim 4, wherein said plurality of machine code instructions includes at least one instruction in an Address Register Indirect with Index and Displacement addressing mode of the microprocessor, the relative pixel location being at least partly encoded by the combination of the index and displacement fields of said instruction.

6. A method of displaying selected characters in an output image of a display device wherein machine code routines have been stored in accordance with a method as claimed in claim 1, the method comprising executing the stored routine which corresponds to each selected character to store the selected character in bit map form in the display memory of the display device by writing color data to display memory locations corresponding to the foreground pixel locations of the character bit map.

7. A method as claimed in claim 6, further comprising the step of storing a base location address for the character in an address register of the microprocessor prior to executing said routine.

8. A method as claimed in claim 7, further comprising the step of storing a color value for the character in a data register of the microprocessor prior to executing said routine.

* * * * *